United States Patent
Pinault

(10) Patent No.: US 6,741,872 B1
(45) Date of Patent: May 25, 2004

(54) METHOD OF AUTHORIZING ACCESS TO A CELLULAR MOBILE RADIO NETWORK FROM A SIMPLIFIED TELEPHONE AND AN ASSOCIATED MOBILE RADIO SYSTEM AND SIMPLIFIED TELEPHONE

(75) Inventor: Francis Pinault, Bois-Colombes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/588,352

(22) Filed: Jun. 7, 2000

(30) Foreign Application Priority Data

Jun. 10, 1999 (FR) .............................. 99 07325

(51) Int. Cl.[7] .............................. H04B 1/38; H04M 1/00
(52) U.S. Cl. ...................... 455/564; 455/565; 455/411
(58) Field of Search ................................. 455/411, 564, 455/565, 404

(56) References Cited

U.S. PATENT DOCUMENTS

| | | | | |
|---|---|---|---|---|
| 5,553,315 A | * | 9/1996 | Sobti .................... 455/56.1 |
| 5,797,101 A | * | 8/1998 | Osmani .................. 455/551 |
| 5,818,915 A | | 10/1998 | Hayes, Jr. et al. | |
| 5,887,249 A | * | 3/1999 | Schmid .................. 455/411 |
| 6,044,257 A | * | 3/2000 | Boling ................... 455/404 |
| 6,061,558 A | * | 5/2000 | Kennedy ................. 455/411 |
| 6,081,705 A | * | 6/2000 | Houde .................... 455/411 |

FOREIGN PATENT DOCUMENTS

| | | |
|---|---|---|
| EP | 0 367 361 A2 | 5/1990 |
| WO | WO 98/12891 | 3/1998 |

* cited by examiner

*Primary Examiner*—Vivian Chang
*Assistant Examiner*—James K Moore
(74) *Attorney, Agent, or Firm*—Sughrue Mion, PLLC

(57) ABSTRACT

The present invention consists of a method of authorizing access to a cellular mobile radio network from a simplified mobile telephone, simplified in particular in that it does not include a reader adapted to receive a subscriber identification module. According to the invention, access to the network is made possible in particular by a service initialization phase during which a subscriber to the network supplies to the network data representing a serial number specific to the simplified mobile telephone, for example its IMEI number, and data characteristic of each telephone number that can be called from the simplified mobile telephone, all of the data being stored in a data base of a server of the network in a private directory associated with the simplified mobile telephone.

16 Claims, 4 Drawing Sheets

METHOD OF AUTHORIZING ACCESS TO A CELLULAR MOBILE RADIO NETWORK FROM A SIMPLIFIED TELEPHONE AND AN ASSOCIATED MOBILE RADIO SYSTEM AND SIMPLIFIED TELEPHONE

The present invention relates to a method of authorizing access to a cellular mobile radio network from a simplified mobile telephone, which is simplified in particular in that it does not include a reader adapted to receive a subscriber identification module, and to a mobile radio system and a simplified telephone for implementing the method.

BACKGROUND OF THE INVENTION

At present a mobile telephone can be used in a particular cellular network only if it is fitted with a subscriber identification module supplied by the network operator or its distributors and containing information about the user. In the non-limiting case of the pan-European GSM network, the subscriber identification module (SIM) takes the form of a smart card to the ISO standard format or a microcard inserted into a reader in the mobile telephone. The data stored in the SIM card enables the telephone to identify itself to the network. If the network recognizes the data stored in the card, at the end of a phase referred to as "logging on", the user is authorized to use the network, and in particular to make outgoing calls, and can receive calls routed via the network.

An advantage of a SIM card, or more generally of a subscriber identification module, is that it enables the possessor of the module to access the network from any mobile terminal adapted to receive the module.

However, to prevent anyone from using a mobile telephone without the subscriber's authorization, a particular authentication procedure obliges the user to enter a particular code (PIN) stored in the card when the mobile telephone equipped with the SIM card is switched on. In other words, the mobile telephone cannot log onto the cellular network if the user enters the wrong code.

The number of private persons acquiring a mobile telephone has greatly increased recently. However, these are mostly persons within a predetermined age range. The benefits of being able to contact someone or of being contactable at any time should nevertheless be accessible regardless of age, and in particular to young children.

However, in this context, existing mobile telephones have the following disadvantages:

Installing the SIM card before the telephone is used for the first time can be difficult, especially in the case of a microSIM card.

The authentication procedure previously described can also be complicated for some users, such as young children. It is possible to deactivate this procedure, of course, but its security advantages are then lost.

It is also necessary to be able to control calls made by a child, for obvious cost reasons, and therefore to be able to limit how many numbers can be called from the telephone. Some operators allow for this by offering cards containing a directory with a limited number of entries, so that children can initialize outgoing calls only to a restricted set of numbers.

Finally, apart from the fact that operation of the telephones currently available is complex, they are costly for the user to purchase. It is therefore clearly difficult for parents to invest in a portable telephone for each of their children.

OBJECT AND SUMMARY OF THE INVENTION

The object of the present invention is to solve the above problems by proposing a method of authorizing access to a cellular mobile radio network from a simplified telephone, simplified in particular in that it does not include a subscriber identification module.

To this end, the present invention provides a method of authorizing access to a public radio network, which method includes the following phases:

a service initialization phase during which a subscriber to the network supplies the network with data representing a serial number specific to a simplified mobile telephone adapted to operate in the network with no subscriber identification module and including means for calling a predefined telephone number and with data characteristic of said predefined telephone number, all of which data is stored in the network;

a phase during which said simplified mobile telephone logs onto said network and, to connect to said service, automatically transmits to the network by radio the data representing the serial number and a first code representing the service number, the network connects to the service and then compares the received data representing the serial number with the stored data representing the serial number, authorizes logging on if there is a match and transmits an authorization code to the simplified mobile telephone by radio, said authorization code being also stored in the network; and a phase during which said simplified mobile telephone is used to make an outgoing call and activation of said means for calling the predefined telephone number causes the transmission by radio to the network of the first code representing the service number for connecting to said service, said authorization code and a second code representing the called number, the network connects to the service and then compares the authorization code and the second code it has received with the data and the authorization code stored in the network and authorizes the call if there is a match.

The invention also provides a mobile radio system including a public mobile radio network, which system also includes:

a simplified mobile telephone adapted to operate in the network with no subscriber identification module and including means for calling a predefined telephone number;

means for initializing the service whereby a subscriber to said network supplies the network with data representing a serial number specific to said simplified mobile telephone and data characteristic of said predefined telephone number, all of said data being stored in the network;

automatic transmission means specific to said simplified mobile telephone for transmitting to the network by radio the data representing the serial number and a first code representing the service number for connecting to said service;

first means specific to the network for comparing, after connection to the service, the received data representing the serial number with the stored data representing the serial number, authorizing the simplified mobile telephone to log onto the network if there is a match, and then transmitting an authorization code to said simplified mobile telephone and storing that authorization code in the network;

transmission means specific to said simplified mobile telephone for transmitting to the network by radio, following activation of said means for calling the predefined telephone number, the first code representing the service number, for connecting to said service, the authorization code and a second code representing the called number; and second means specific to the network for comparing, after connection to the service, the authorization code and the second code received with the data and the authorization code stored in the network and for authorizing the call if there is a match.

The invention thirdly provides a simplified mobile telephone including radio signal transmission means for logging onto and making a call in a cellular mobile radio network and means for entering a predefined telephone number, wherein the telephone has a serial number specific to it and during logging on said transmission means transmit a radio signal including data representing said serial number and a first code representing a service number, wherein the telephone further includes means for storing an authorization code sent by the network after logging on, and wherein, during the call to said predefined telephone number, said transmission means transmit a radio signal including the first code, the authorization code and a second code representing the predefined telephone number.

BRIEF DESCRIPTION OF THE DRAWINGS

The present invention and its advantages will be better understood in the light of the following description, which is given with reference to the accompanying drawings, in which.

MORE DETAILED DESCRIPTION

Figure 1:
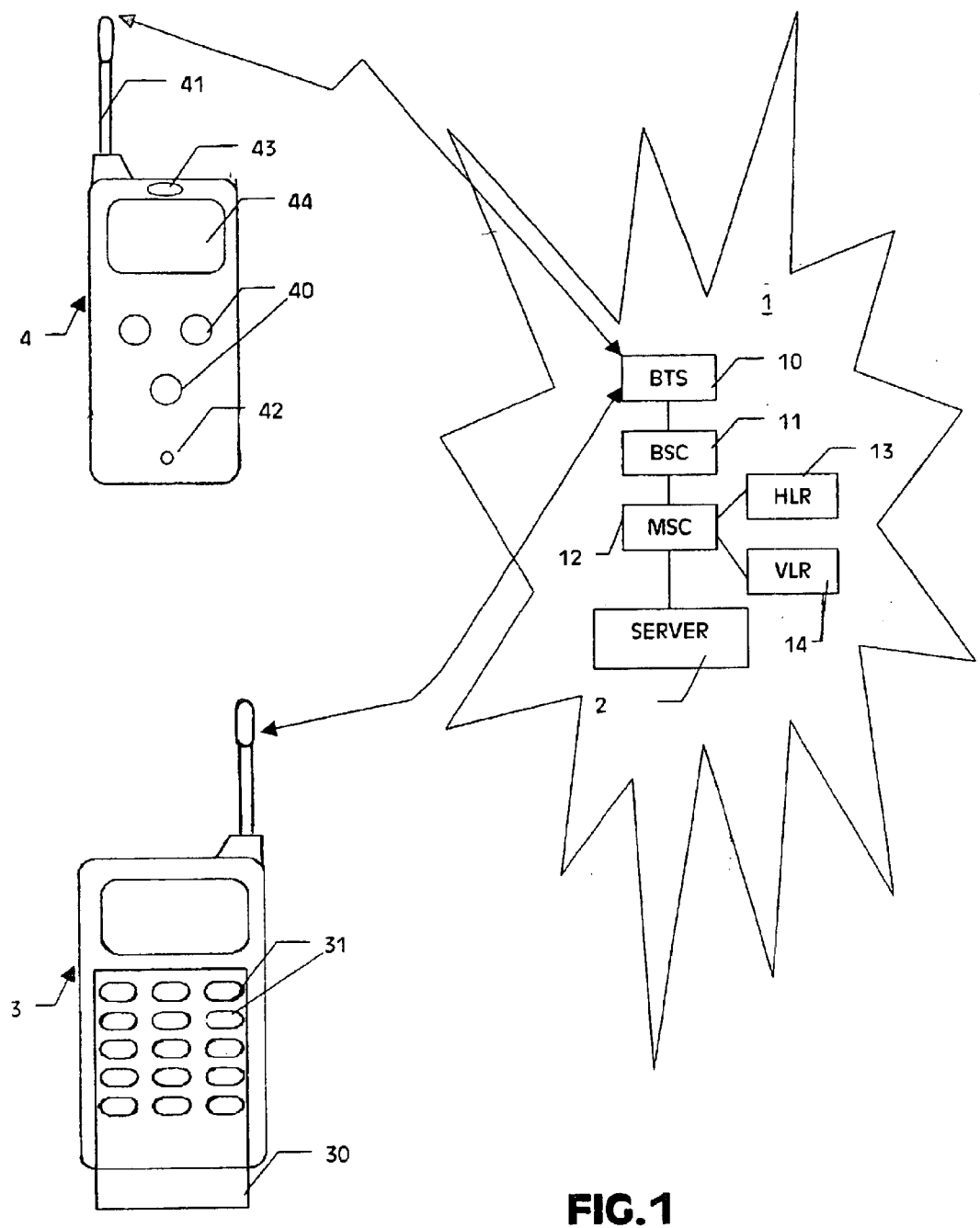
FIG. 1 is a diagram showing various components of a cellular mobile radio system according to the invention.

Referring to FIG. 1, a mobile radio system according to the invention includes a cellular network 1, for example a GSM network, a server 2 connected to or included in the network 1, a standard mobile telephone 3 adapted to operate in the cellular network subject to taking out a subscription, and a simplified mobile telephone 4.

The expression "simplified mobile telephone" refers to a mobile telephone adapted to operate in the cellular network 1 without a subscriber identification module, as opposed to the standard mobile telephone 3 which includes a card reader (not shown) into which an identification module 30 specific to the subscriber can be inserted. In the remainder of the description, the subscriber and their identification module 30 are referred to interchangeably. All the radio parameters necessary for the mobile telephone 4 to operate are stored in a memory specific to the mobile telephone.

The mobile telephone 4 is also simplified in that it can make calls only to a limited set of telephone numbers, for example a set of three numbers in the case of FIG. 1. The keypad of the telephone 4 can therefore be reduced to a number of keys 40 corresponding to at least the number of numbers that can be called.

The simplified mobile telephone 4 further includes:
means for transmitting radio signals, including in particular an antenna 41; and
a microphone 42 and an earpiece 43.

Although this is not necessary for implementing the invention, the simplified mobile telephone 4 can also include a display screen 44.

According to the invention, the simplified mobile telephone 4 is enabled to access the network 1 by the subscriber 30 of the standard mobile telephone 3 executing a particular service initialization phase during which that subscriber supplies to the network 1 data representing a serial number specific to the simplified mobile telephone 4, for example its IMEI (international mobile station equipment identity) number, and data characteristic of each telephone number that can be called from the simplified mobile telephone 4. The data is stored in a database of the server 2, in a private directory associated with the simplified mobile telephone 4.

Figure 2:
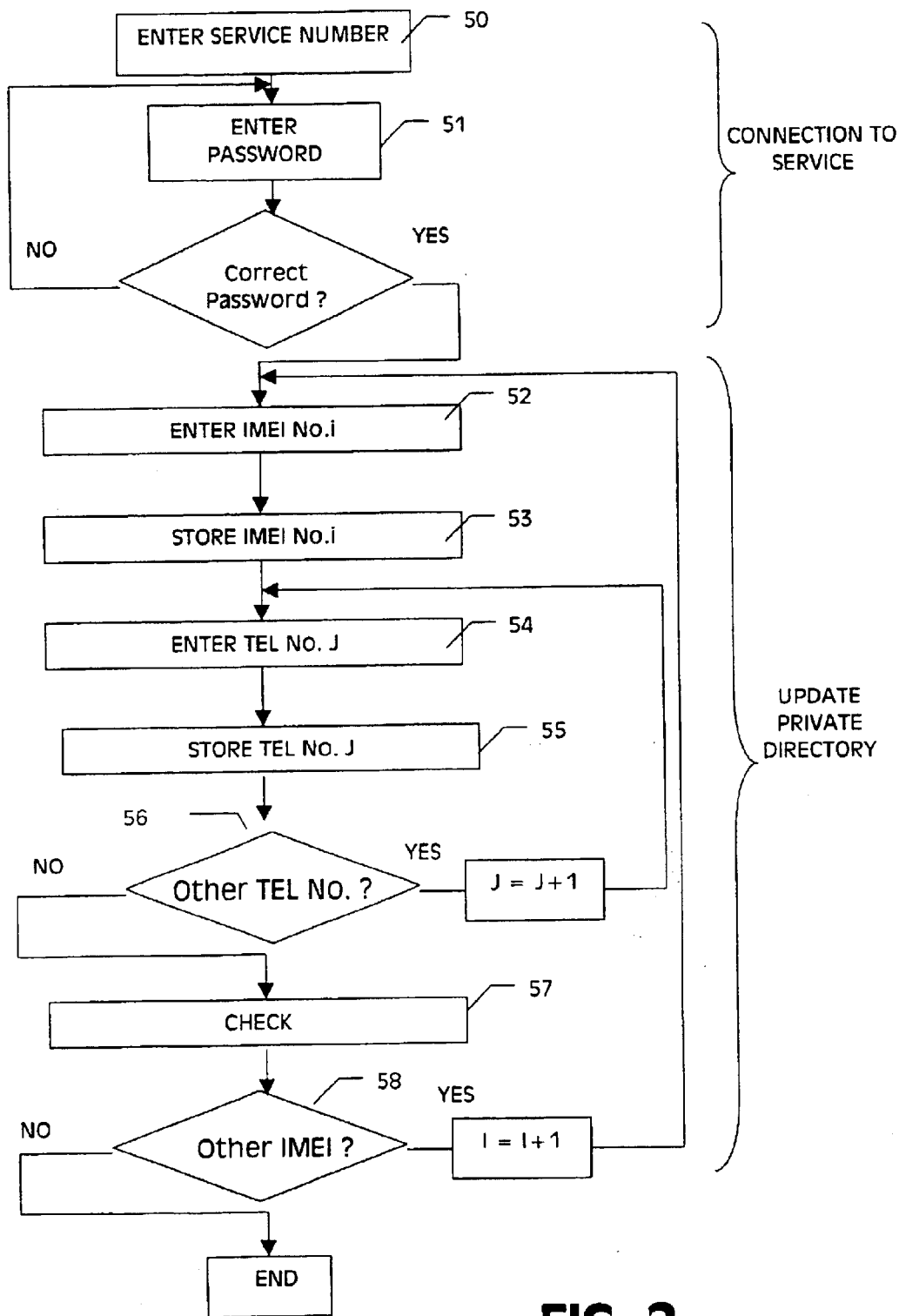
FIG. 2 shows the steps of an initialization phase in one embodiment of a method according to the invention.

FIG. 2 is a diagram showing the steps of the initialization phase previously referred to. Those steps are grouped into two phases: a first phase referred to as the "connection to service phase" and a second phase of updating the private directory.

To connect to the service using the standard mobile telephone 3, the subscriber 30 must first enter, on buttons 31, a number representing the service number associated with the server 2 (step 50). Then, for security reasons, the subscriber must preferably enter a password (step 51). If the password is correct, the subscriber 30 is prompted to enter the data (the IMEI) representing the serial number of the simplified mobile telephone 4 (step 52). This data is transmitted to the network by radio and stored in the database of the server 2 (step 53). The subscriber 30 is then prompted to enter data characteristic of each telephone number J that it will be possible to call from the simplified mobile telephone 4 (step 54). In the FIG. 1 example, the subscriber 30 can associate a given telephone number with each of the three keys 40 of the simplified telephone 4. This data is also stored in the database of the server 2 (step 55). Steps 54 and 55 are repeated as many times as the subscriber 30 wishes to enter a new number that can be called (step 56). At the end of the process of updating the private directory relating to the simplified mobile telephone 4, there is preferably a verification step (step 57) during which the subscriber can check the accuracy of all the data transmitted. Steps 52 to 57 are then repeated (step 58) if the subscriber wishes to initialize another simplified mobile telephone, to create or update the private directory associated with that other simplified telephone.

The subscriber 30 can of course carry out this initialization phase from a telecommunication device other than their mobile telephone 4, for example from a telephone connected to the PSTN or via the Internet.

Figure 3:
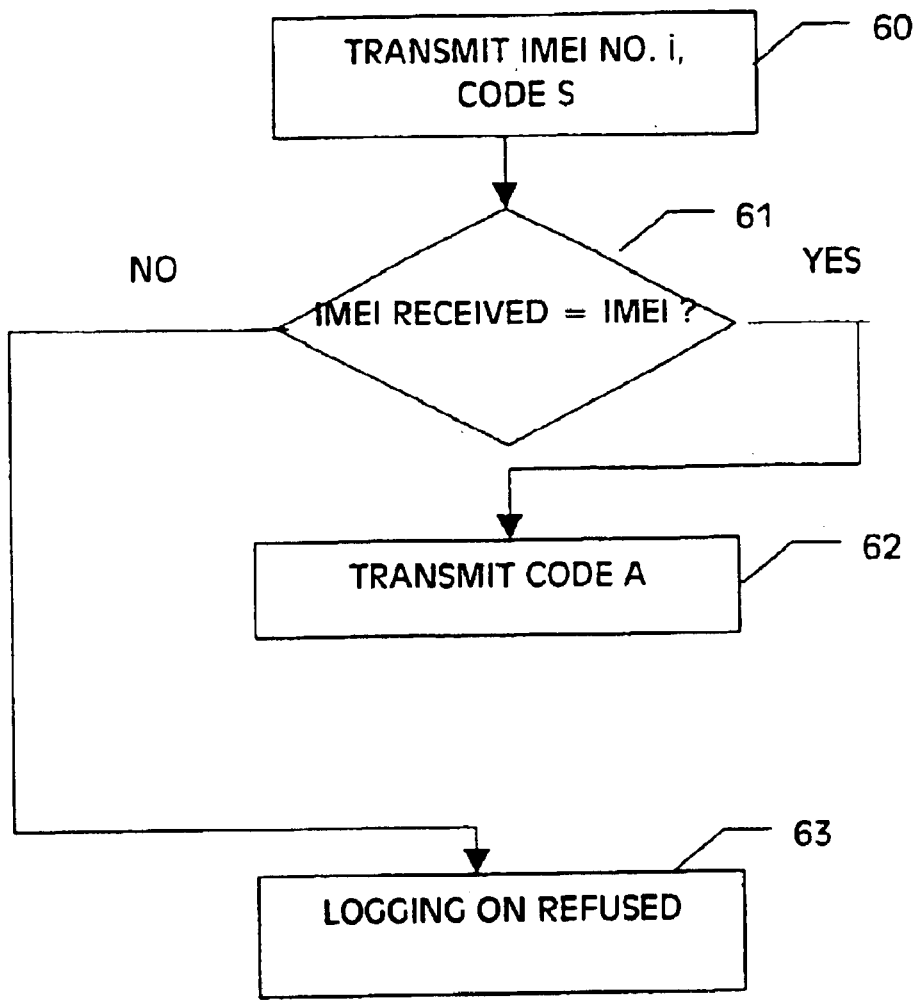
FIG. 3 shows the steps of a simplified telephone logging on phase in one embodiment of a method according to the invention.

When the initialization phase has been completed, the simplified telephone 4 can access the network 1. When it is switched on, the simplified telephone 4 first logs onto the network 1, like any standard mobile telephone. However, the process it uses differs from the logging on of a standard mobile telephone, as specified in the GSM recommendations, because the telephone 4 has no subscriber identification module. The logging on phase in accordance with the present invention is described with reference to FIG. 3:

During the logging on phase, the simplified telephone 4 transmits the data (the IMEI) representing its serial number and the code S representing the service to the network by radio, in order to enable connection to the server 2 (step 60). After connection to the server 2, the network 1 can check in the database of the server 2 if the data (the IMEI) received corresponds to data stored in a private directory, or in a public directory if the service is generalized for all operators (step 61). If no match is found, logging onto the network is refused (step 63). If a match is found, logging onto the network is authorized and the network 1 sends the simplified mobile telephone 4 an authorization code A that is stored in the network and in storage means (not shown) of the simplified telephone 4 (step 62). In a first embodiment, the authorization code A corresponds exactly to the IMEI. The authorization code can instead be a temporary code that is either generated by the network and chosen at random from a list of codes that do not correspond to any subscriber of the network 1 or corresponds to an identifier of the subscriber 30.

During the preceding process, the routing within the network 1, following a request for the mobile telephone 4 to log onto the network, is as follows: the base station 10 of the network 1 in the cell in which the mobile telephone 4 is located transmits the log-on request to the station controller 11, the request including the data (the IMEI) transmitted by the mobile telephone 4. The controller then forwards the request to the mobile switch center (MSC) 12. The MSC calls the server 2, although in the normal situation it would forward the request to a home location register (HLR) 13 or a visitor location register (VLR) 14. It checks the database of the server 2 to see if there is a directory associated with the IMEI received. Where appropriate, the reverse routing is used to transmit the authorization code A to the mobile telephone 4.

However, other routings within the network 1 can be envisaged that do not depart from the scope of the invention. In particular, the routing normally used by a standard mobile telephone, such as the mobile telephone 3, to log onto the network can be used, in which case the controller 12 searches for the directory related to the IMEI received in the home location register 13 and possibly in the visitor location register 14. This presupposes that the registers 13 and 14 have both been updated beforehand by the server 2.

Note that this logging on process enables the network to store information on the location of the simplified mobile telephone 4 when the latter is using the network, either because the server 2 stored the cell in which the simplified mobile telephone 4 was located when it logged on or because the register 13 or 14 has stored that information, as specified in a GSM network, for example.

Each time the simplified mobile telephone 4 changes cell within the network, the data is updated either in the server 2 or in the register 13 or 14. Updating is done either during a call or in the standby mode (for example using the location updating procedure described in the GSM recommendations). This updating mechanism uses the same routing of information as described in connection with the procedure for logging onto the service or operative after the simplified telephone is switched off.

When the mobile telephone 4 has received an authorization code A from the network 1, it is ready to make a call. The phase of using the mobile telephone 4 for an outgoing call, described with reference to FIG. 4, includes a step of connection to the service and a step of routing to the called telephone number:

CONNECTION TO THE SERVICE (STEP 70):

When the user of the mobile telephone 4 presses one of the keys 40 on the telephone (FIG. 1), the code S representing the service associated with the server 2 is transmitted by radio to the network 1, together with the authorization code A previously sent by the network during the logging on phase and a code Q associated with the key 40 that has been pressed, and therefore with the called number.

ROUTING TO THE CALLED NUMBER:

The network then carries out a series of comparisons in order to perform the routing: first of all (step 71), it uses the authorization code A received to determine if the database of the server 2 contains a private directory corresponding to the mobile telephone 4. If not, the call cannot be set up. If a corresponding directory is found, the network uses the code Q received to determine if there is a telephone number corresponding to the key 40 which has been pressed in the private directory in the database (step 72). If not, call set-up is refused; if a telephone number is found, however, the call can be set up (step 73).

Figure 4:
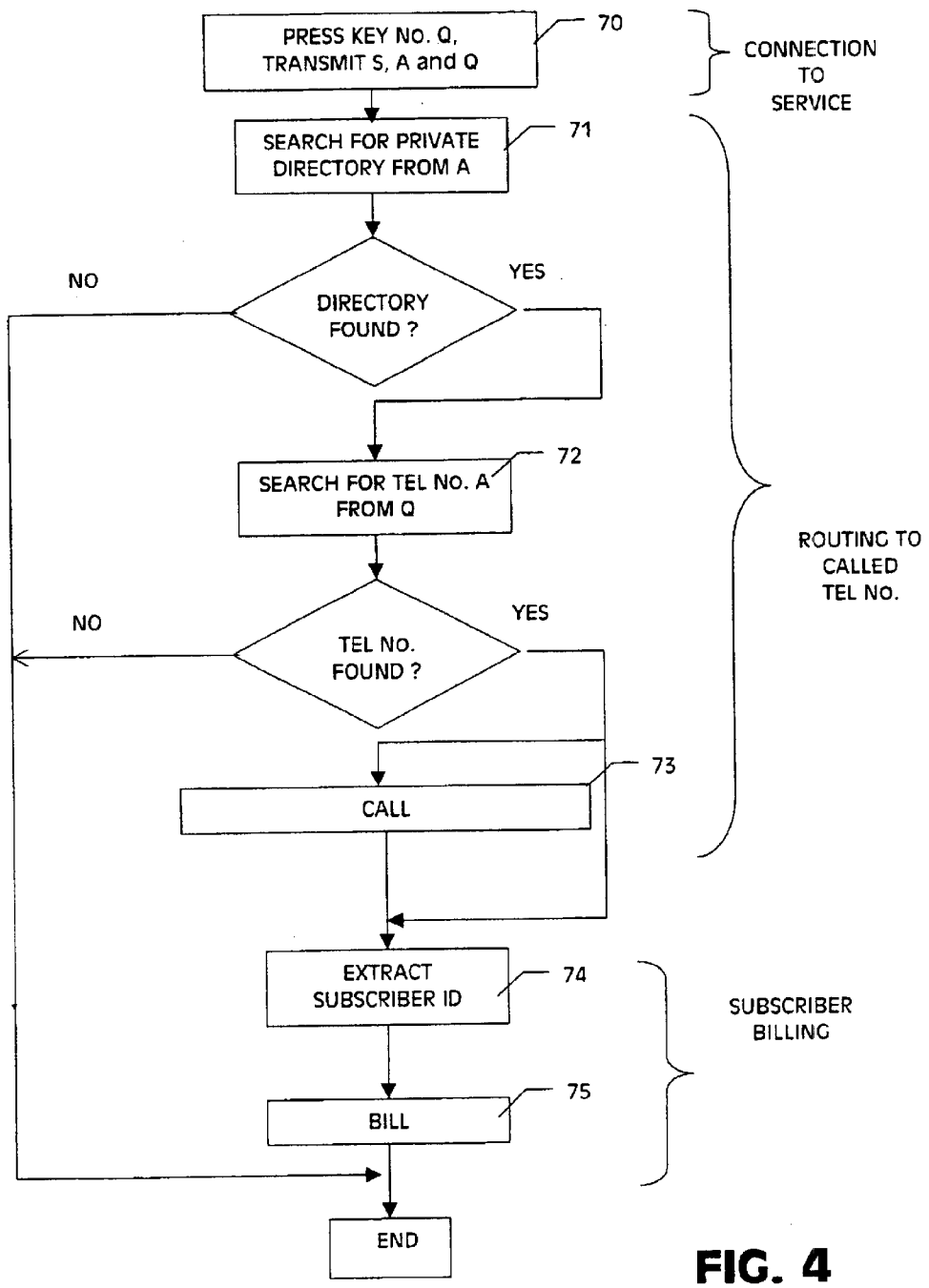
FIG. 4 shows the steps of a phase in which the simplified mobile telephone makes an outgoing call and the steps of a billing phase in one embodiment of the method according to the invention.

In a preferred embodiment of the invention, the process further includes a phase of transmitting billing information to an account of the subscriber 30. Referring to FIG. 4, this phase can entail, after each call made from the simplified mobile telephone 4, extracting the identifier of the subscriber who initialized the service in order to draw up a list of all calls made (step 74) and then billing the account of the subscriber 30, for example at monthly intervals (step 75).

Everything as described so far relates to authorizing the simplified mobile telephone 4 to access the network 1 so that it can log onto the network and make outgoing calls to a limited set of numbers.

Consider now the possibility that the simplified mobile telephone can also be called. This is possible because once the mobile telephone 4 has logged onto the network the latter knows its location:

In a first implementation of the invention, the simplified mobile telephone 4 cannot receive incoming calls directly, but only an indication that a person on one of the limited set of telephone numbers that it can call wishes to contact it. In this case, the person seeking to contact the user of the simplified mobile telephone 4 connects to the service offered by the server 2 and inputs the IMEI representing the simplified mobile telephone 4. The network 1 can then determine which cell of the network, if any, the mobile telephone 4 last logged onto. If a cell is found, the network 1 then sends the simplified mobile telephone 4 a service message or an SMS-PP (short message service point-to-point) message containing data relating to the caller. On receiving a message of this kind, and if it has a display screen, the simplified mobile telephone 4 can display a message telling the user of the mobile telephone 4 that they should call the person seeking to contact them. If there is no display screen, the key 40 associated with the telephone number of the caller can be caused to blink on and off. This latter variant is very practical for a child, who need only press the key which is blinking on and off to call the person seeking to contact them.

In a preferred embodiment of the invention, the simplified mobile telephone 4 can receive an incoming call from the network 1 directly. The main problem that arises in this case is that a cellular mobile radio network, for example a GSM network, can send a call to a mobile telephone only by sending a particular message including the IMSI (international mobile subscriber identity) on a dedicated paging channel (PCH). The simplified mobile telephone 4 has no IMSI, as it has no subscriber identification module. A first attempt at a solution to this problem might be to use a dummy IMSI code selected from a list of codes not corresponding to any real subscriber's IMSI during manufacture of the simplified mobile telephone or at its point of sale. The limitations of any such solution, in terms of the number of dummy codes that it would be necessary to generate, are obvious. It is therefore necessary to find another solution to the problem of directing a call to the mobile telephone 4 so that it is not necessary to change the structure of the paging message or to generate an excessive number of dummy IMSI codes.

A first solution proposed by the present invention consists of:

storing a list of n specific codes with the same structure as an IMSI code, for example 10 codes, in a memory of the simplified mobile telephone 4 during manufacture of the telephone, this list being known to the network 1 and being identical for all simplified mobile telephones that can access the network 1, and assigning the mobile telephone 4 a particular and unique sequence of m codes from the list, for example 4 codes (m <n).

To route a call to the simplified mobile telephone 4, all the network has to do is to transmit on the PCH of the cell in which the simplified mobile telephone 4 is located an identifier made up of m successive messages (here m=4) each conveying an IMSI code in accordance with the sequence assigned to the simplified mobile telephone 4. The simplified mobile telephone 4 can then recognize its own sequence and respond to the call. With this solution, the network can route calls to $C^n_m$ separate simplified telephones, each of which has its own unique sequence based on the same list of dummy codes.

A second solution proposed by the invention is to allocate a dummy IMSI code during manufacture of the simplified mobile telephone 4 or at its point of sale. The code can be common to different simplified telephones. An identifier made up of the combination of the dummy IMSI code and the IMEI code is then used in the call message. The second solution is more reliable than the previous one and enables a call to be routed more quickly.

A third solution is to use the IMEI number of the terminal 4 directly in the call message. This solution has the benefit of not requiring any additional data to be created to enable use of the service.

What is claimed is:

1. A method of authorizing access to a public radio network, the method comprising the steps of:

initializing service during which a subscriber to the network supplies the network with data representing a serial number specific to a simplified mobile telephone adapted to operate in the network with no subscriber identification module and including at least one key for calling a predefined telephone number having a plurality of digits, and with data corresponding to said predefined telephone number, wherein the data representing the serial number and the data corresponding to said predefined telephone number is stored in the network;

logging said simplified mobile telephone onto said network by transmitting to the network by radio the data representing the serial number and a first code representing a service number for connecting to the service, connecting the network to the service and then comparing the data representing the serial number transmitted by the simplified mobile telephone with the data representing the serial number stored in the network, authorizing logging on if there is a match between the data representing the serial number received from the simplified mobile telephone with the data representing the serial number stored in the network, transmitting an authorization code to the simplified mobile telephone by radio, and storing said authorization code in the network and the simplified mobile phone; and making an outgoing call to said predetermined number from said simplified mobile telephone by transmitting to the network, in response to actuation of said key of the simplified mobile phone, the first code representing the service number for connecting to said service, said authorization code and a second code associated with the actuated key which is not the digits of said predefined telephone number, the network connecting to the service and then comparing the authorization code transmitted by the simplified mobile telephone with the authorization code stored in the network, determining if said second code corresponds to the predefined telephone number stored in the network if there is a match between the authorization code transmitted by the simplified mobile telephone and the authorization code stored in the network, and setting up the call between the simplified mobile and the predetermined number.

2. A method according to claim 1, wherein the authorization code transmitted by the network to the simplified mobile telephone during the step of logging on corresponds to the data representing the serial number.

3. A method according to claim 1, wherein the authorization code transmitted by the network to the simplified mobile telephone during the step of logging on corresponds to a temporary code stored in the simplified mobile telephone.

4. A method according to claim 3, wherein the temporary code corresponds to an identifier of the subscriber.

5. A method according to claim 3, wherein the temporary code is chosen at random from a predetermined list of codes that do not correspond to any subscriber.

6. A method according to claim 1, further including transmitting billing information to an account of said subscriber.

7. A method according to claim 1, wherein said step of initializing comprises supplying the network with said data from a standard mobile telephone which has an identification module associated with said subscriber.

8. A method according to claim 7, wherein said step of initializing includes the following steps, performed using entry means of the standard mobile telephone:

entering a number representing the service number, for connecting to said service;

entering a password;

entering the data representing the serial number specific to the simplified mobile telephone; and entering the predefined telephone number.

9. A method according to claim 1, further including using the network to store information on the location of said simplified mobile telephone.

10. A method according to claim 9, further comprising the step of using the simplified mobile telephone to receive an incoming call during said step of the network sending, and wherein the network sends said radio signal on a call signaling channel.

11. A method according to claim 10, wherein said identifier consists of m successive messages each conveying a predefined code in a sequence specific to the simplified mobile telephone.

12. A method according to claim 11, wherein said sequence is made up of m codes chosen from a predetermined list of n codes.

13. A method according to claim 10, wherein said identifier is made up of the combination of a predefined code and the data representing the serial number specific to the simplified mobile telephone and is conveyed by a single message on the call signaling channel.

14. A method according to claim 10, wherein said identifier is the data representing the serial number specific to the simplified mobile telephone and is conveyed in a single message on the call signaling channel.

15. A mobile radio system comprising:

a public mobile radio network;

a simplified mobile telephone adapted to operate in the network with no subscriber identification module;

means for initializing a service whereby a subscriber to said network supplies the network with data representing a serial number corresponding to said simplified mobile telephone and data corresponding to a predefined telephone number having a plurality of digits, wherein said data representing said serial number and said data corresponding to said predetermined telephone number is stored in the network;

the simplified mobile telephone comprising:

at least one key for calling said predefined telephone number;

automatic transmission means for initiating logging said simplified mobile telephone onto said network by transmitting to the network the data representing the serial number and a first code representing a service number for connecting to a service; and transmission means for transmitting to the network by radio, in response to actuation of said key, a first code representing the service number for connecting to said service, an authorization code received from said network, and a second code associated with said key which is not the digits of the predetermined number; and the network comprising:

means for logging said simplified mobile telephone onto said network by comparing, after connection to the service, the data representing the serial number transmitted by the simplified mobile telephone with the stored data representing the serial number, authorizing the simplified mobile telephone to log onto the network if there is a match between the data representing the serial number transmitted by the simplified mobile telephone with the stored data representing the serial number, and then transmitting the authorization code to said simplified mobile telephone and storing the authorization code in the network; and means for connecting said simplified mobile phone to said predetermined telephone number by comparing, after connection to the service, the authorization code transmitted by said simplified mobile phone with the authorization code stored in the network, determining if said second code transmitted by simplified mobile phone corresponds to the predetermined telephone number stored in the network if there is a match between the authorization code transmitted by the simplified mobile telephone and the authorization code stored in the network, and setting up the call between the simplified mobile and the predetermined number.

16. A simplified mobile telephone comprising:

at least one key for calling a predefined telephone number having a plurality of digits;

radio signal transmission means for logging onto and making a call in a cellular mobile radio network, wherein during logging onto the network, said transmission means transmits a radio signal including data representing a serial number of said simplified mobile telephone and a first code representing a service number, and wherein, during making the call to said predefined telephone number in response to actuation of the key, said transmission means transmits a radio signal including the first code, an authorization code received from the network after logging onto the network, and a second code associated with the key which is not the digits of the predefined telephone number.

* * * * *